US008335161B2

(12) United States Patent  
Foottit et al.

(10) Patent No.: US 8,335,161 B2
(45) Date of Patent: *Dec. 18, 2012

(54) SYSTEMS AND METHODS FOR NETWORK CONGESTION MANAGEMENT USING RADIO ACCESS NETWORK CONGESTION INDICATORS

(75) Inventors: Tom Foottit, Stittsville (CA); Masilamany Raguparan, Kanata (CA); Shannon Bell, Ottawa (CA)

(73) Assignee: Bridgewater Systems Corp., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/018,129

(22) Filed: Jan. 31, 2011

(65) Prior Publication Data

US 2012/0026879 A1 Feb. 2, 2012

Related U.S. Application Data

(60) Provisional application No. 61/301,071, filed on Feb. 3, 2010.

(51) Int. Cl.
*G01R 31/08* (2006.01)
*H04W 4/00* (2009.01)
*H04J 3/18* (2006.01)
*G06F 15/16* (2006.01)

(52) U.S. Cl. .................. 370/236; 370/230.1; 370/328; 370/477; 709/235

(58) Field of Classification Search .............. 370/229, 370/230, 230.1, 232, 235, 236, 248, 252, 370/277–278, 310, 320, 328–335, 352, 353, 370/441, 474, 477; 709/224, 225, 232, 233, 709/235

See application file for complete search history.

(56) References Cited

U.S. PATENT DOCUMENTS 6,714,515 B1 3/2004 Marchand
6,889,050 B1 5/2005 Willars et al.
7,068,607 B2 6/2006 Partain et al.
(Continued)

FOREIGN PATENT DOCUMENTS

EP 1858198 A1 11/2007
(Continued)

OTHER PUBLICATIONS

Kasera, S. K. et al., "Congestion Control Policies for IP-based CDMA Radio Access Networks," IEEE Transactions on Mobile Computing, 2005, vol. 4, Issue 4, pp. 1-11.
(Continued)

*Primary Examiner* — Michael Thier
*Assistant Examiner* — Redentor Pasia
(74) *Attorney, Agent, or Firm* — Zilka-Kotab, PC

(57) ABSTRACT

Systems and methods for managing communications network congestion are provided. In an embodiment, the system includes a radio access network (RAN) interface configured to receive RAN congestion indicators, a congestion correlator module configured to correlate RAN congestion indicators to service congestion indicators, a database comprising a set of congestion based policy rules, a policy controller module configured to apply the congestion-based policy rules to achieve a policy decision, and a policy enforcement control point interface configured to transmit network control instructions to enforce the policy decisions. In another embodiment of the invention, a method is provided for managing communications network congestion, that includes receiving one or more radio access network (RAN) congestion indicators, correlating the one or more RAN congestion indicators to one or more service congestion indicators, applying a congestion-based policy rule based on service congestion indicators to generate a policy decision, and implementing the policy decision.

28 Claims, 4 Drawing Sheets

U.S. PATENT DOCUMENTS

| | | | |
|---|---|---|---|
| 7,328,262 B2* | 2/2008 | McDonagh et al. | 709/224 |
| 7,466,652 B2 | 12/2008 | Lau et al. | |
| 7,471,654 B2 | 12/2008 | Mueckenheim et al. | |
| 7,688,731 B2* | 3/2010 | Haumont et al. | 370/235 |
| 7,724,656 B2 | 5/2010 | Sagfors et al. | |
| 7,760,646 B2 | 7/2010 | Kekki | |
| 7,764,680 B2 | 7/2010 | Matsumoto et al. | |
| 8,130,655 B2 | 3/2012 | Foottit et al. | |
| 2002/0186657 A1* | 12/2002 | Jain et al. | 370/235 |
| 2003/0123422 A1 | 7/2003 | Miya | |
| 2004/0054766 A1* | 3/2004 | Vicente | 709/223 |
| 2004/0184483 A1 | 9/2004 | Okamura et al. | |
| 2005/0052994 A1* | 3/2005 | Lee | 370/230 |
| 2007/0036079 A1 | 2/2007 | Chowdury et al. | |
| 2007/0037581 A1 | 2/2007 | Morita | |
| 2008/0008093 A1 | 1/2008 | Wang et al. | |
| 2008/0037552 A1* | 2/2008 | Dos Remedios et al. | 370/395.21 |
| 2008/0043623 A1* | 2/2008 | Franceschini et al. | 370/235 |
| 2008/0186862 A1 | 8/2008 | Corbett et al. | |
| 2009/0285099 A1* | 11/2009 | Kahn et al. | 370/236 |
| 2009/0287764 A1 | 11/2009 | Pazhyannur et al. | |
| 2009/0323528 A1 | 12/2009 | Loiacono et al. | |
| 2010/0103820 A1* | 4/2010 | Fuller et al. | 370/236 |
| 2010/0238805 A1 | 9/2010 | Ludwig et al. | |
| 2011/0280130 A1 | 11/2011 | Foottit et al. | |

FOREIGN PATENT DOCUMENTS

| | | |
|---|---|---|
| JP | 2004015761 A | 1/2004 |
| KR | 100690846 B1 | 2/2007 |
| WO | 03015354 A1 | 2/2003 |
| WO | 2008112774 A2 | 9/2008 |

OTHER PUBLICATIONS

Rangwala, S. et al., "Understanding Congestion Control in Multi-hop Wireless Mesh Networks," Proceedings of the 14th ACM International Conference on Mobile Computing and Networking, Sep. 14-19, 2008, pp. 291-302.

Yoshimura, T. et al., "Rate and Robustness Control with RTP Monitoring Agent for Mobile Multimedia Streaming," IEEE International Conference on Communications, 2002, vol. 4, pp. 2513-2517.

Notice of Allowance from U.S. Appl. No. 13/197,502, dated Jan. 9, 2012.

* cited by examiner

SYSTEMS AND METHODS FOR NETWORK CONGESTION MANAGEMENT USING RADIO ACCESS NETWORK CONGESTION INDICATORS

This application claims the benefit of U.S. Provisional Application No. 61/301,071, filed Feb. 3, 2010, which is incorporated herein in its entirety.

FIELD OF THE INVENTION

The present invention relates generally to communications networks, more particularly, to network congestion management using radio access network congestion indicators.

BACKGROUND

Portable computing devices such as laptop computers, personal data assistants (PDAs), smart phones and the like are in common usage, many featuring data communications support, powerful processors, larger and more colorful displays, and wireless networking and internet browsing capabilities. These advances in mobile technology have resulted in a dramatic increase in the volume of data communicated on wireless networks. These advances, coupled with subscribers seeking expanded mobility, drive subscribers to install and run data-hungry applications on their mobile devices. Data traffic is growing due to a combination of increasing market share of data-centric portable devices such as iPhone® and Blackberry® devices, lower wireless data subscription costs, higher wireless data throughput, and easier mobile access to data-intensive applications and rich content, such as, video. These trends are driving ever-increasing demands for wireless data communications.

Exacerbating the problem of managing this ever-increasing demand for wireless communications services is that a large percentage of wireless traffic within urban centers is managed by a small percentage of the cell sites. As a result, radio access network (RAN) congestion causes degradation in the quality of service for mobile data customers. RAN congestion is a well known problem, however, the correlation of cell site congestion to customers that are actively on those cell sites and their corresponding service plans is not. In particular, while network operators are employing intelligent probe-based solutions, such as those from Kapsch CarrierCom and Netscout, to help understand the overall status of cell sites, including when and where congestion occurs, no mechanism exists to correlate this congestion information from RAN probes into intelligent policy decision and enforcement points in the core wireless network.

What is therefore needed are systems and methods for network congestion management using radio access network congestion indicators measured by RAN probes that are applied within intelligent policy controllers that can then regulate the network resources used by users to better manage service quality.

SUMMARY OF THE INVENTION

Embodiments of the present invention provide systems and methods that improve network congestion management. In an embodiment, a system for managing communications network congestion is provided that includes a radio access network (RAN) interface configured to receive RAN congestion indicators, a congestion correlator module configured to correlate RAN congestion indicators to service congestion indicators, a database comprising a set of congestion based policy rules, wherein the congestion-based policy rules establish control responses based on at least one or more service congestion indicators, a policy controller module configured to apply the congestion-based policy rules to achieve a policy decision, and a policy enforcement control point interface configured to transmit network control instructions to enforce the policy decisions.

In another embodiment of the invention, a method is provided for managing communications network congestion, that includes receiving one or more radio access network (RAN) congestion indicators, correlating the one or more RAN congestion indicators to one or more service congestion indicators, applying a congestion-based policy rule based on the one or more service congestion indicators to generate a policy decision, and implementing the policy decision.

Further embodiments, features, and advantages of the invention, as well as the structure and operation of the various embodiments of the invention are described in detail below with reference to accompanying present drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

Figure 1:
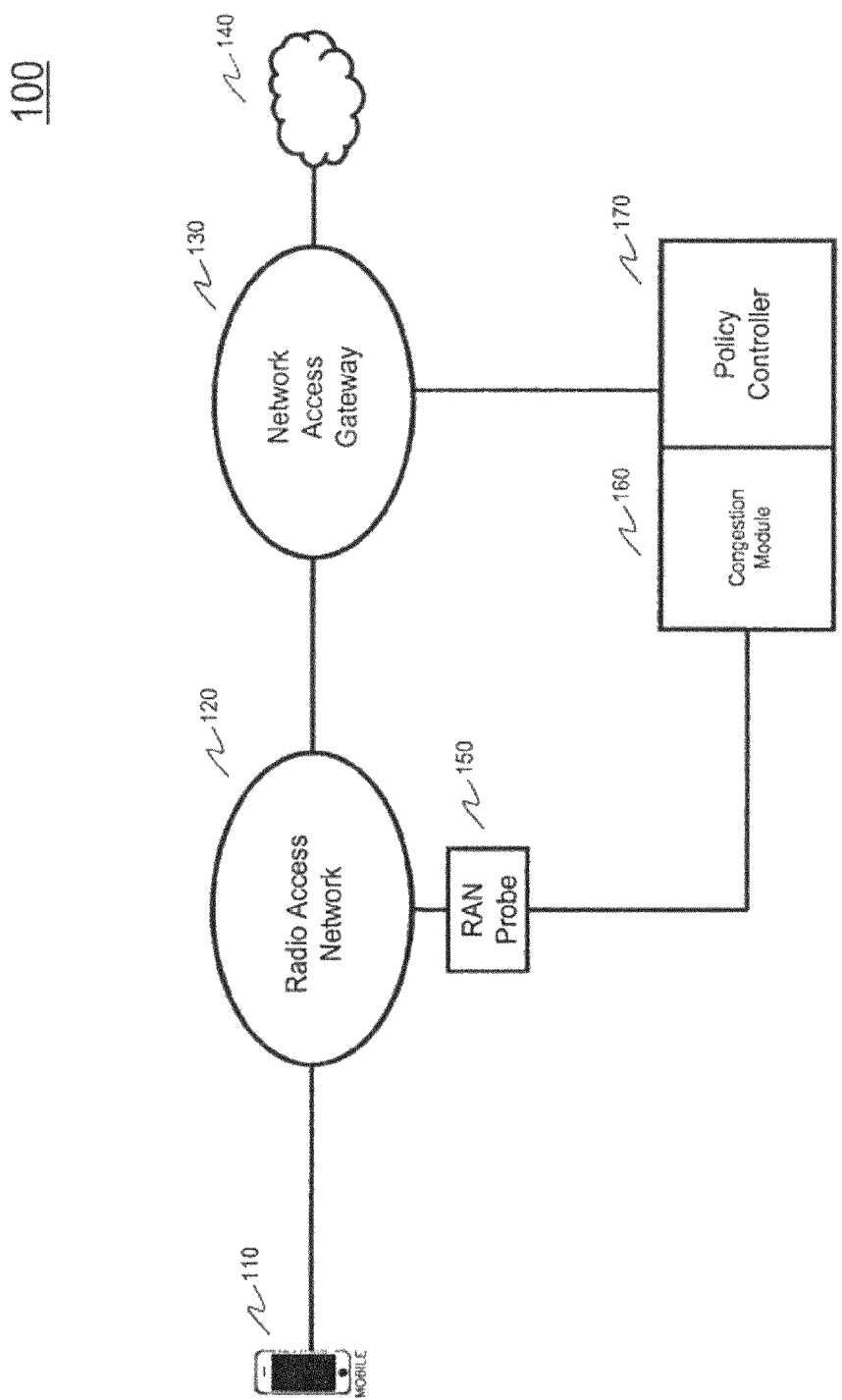
FIG. 1 depicts an exemplary operating environment for using RAN congestion indicators to implement policy decisions, according to embodiments of the invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

FIG. 1 provides an exemplary operating environment 100 for managing communications network congestion, according to embodiments of the invention. Operating environment 100 includes user equipment 110, radio access network (RAN) 120, network access gateway 130, packet network 140, RAN probe 150, congestion module 160 and policy controller 170. Operating environment 100 provides a simplified diagram of a communications network to illustrate the concepts of network congestion management. As would be recognized by persons of skill in the art, embodiments of the present invention can be used in any type of communications network (e.g., wireline, wireless, or hybrid networks).

User equipment 110 is any device that provides a user access to one or more networks. User equipment 110 can include, but is not limited to, a laptop computer, a personal digital assistant (PDA), a wireless phone, a smart phone, or other wireless mobile devices.

Access network 120 is a communications network that couples user equipment 110 to a packet data network 140. Access network 120 may be a third generation partnership project (3GPP) access network, a non-3GPP access network, or other types of access networks. Exemplary 3GPP access networks include the UMTS terrestrial radio access network (UTRAN) and the GSM EDGE radio access network. Other access networks include, but are not limited to WiFi, WiMAX, CDMA2000, GSM, and LTE.

Network access gateway 130 provides an interface between access network 120 and packet data network 140. In a 3GPP network, network access gateway 130 may be the Gateway General Packet Radio Service (GPRS) Support Node (GGSN). Network access gateway 130 may also act as a policy enforcement point.

RAN probe 150 passively monitors RAN 120 to gather RAN congestion indicators. Example RAN probes are provided by Netscout and Kapsch Carriercom. RAN probe 150 is configured to passively gather, for example, RAN congestion indicators such as dropped packets, dropped calls, RAN power consumption, and RAN bit error rates. In a UMTS/UTRAN network, for example, the RAN probe would monitor RAN activity on the Iub interface between the NodeB and the radio network controller (RNC). RAN probe 150 transmits congestion data records containing RAN congestion indicators to Congestion Module 160. In an embodiment, congestion data records are transmitted to Congestion Module 160 using a UDP protocol.

Figure 2:
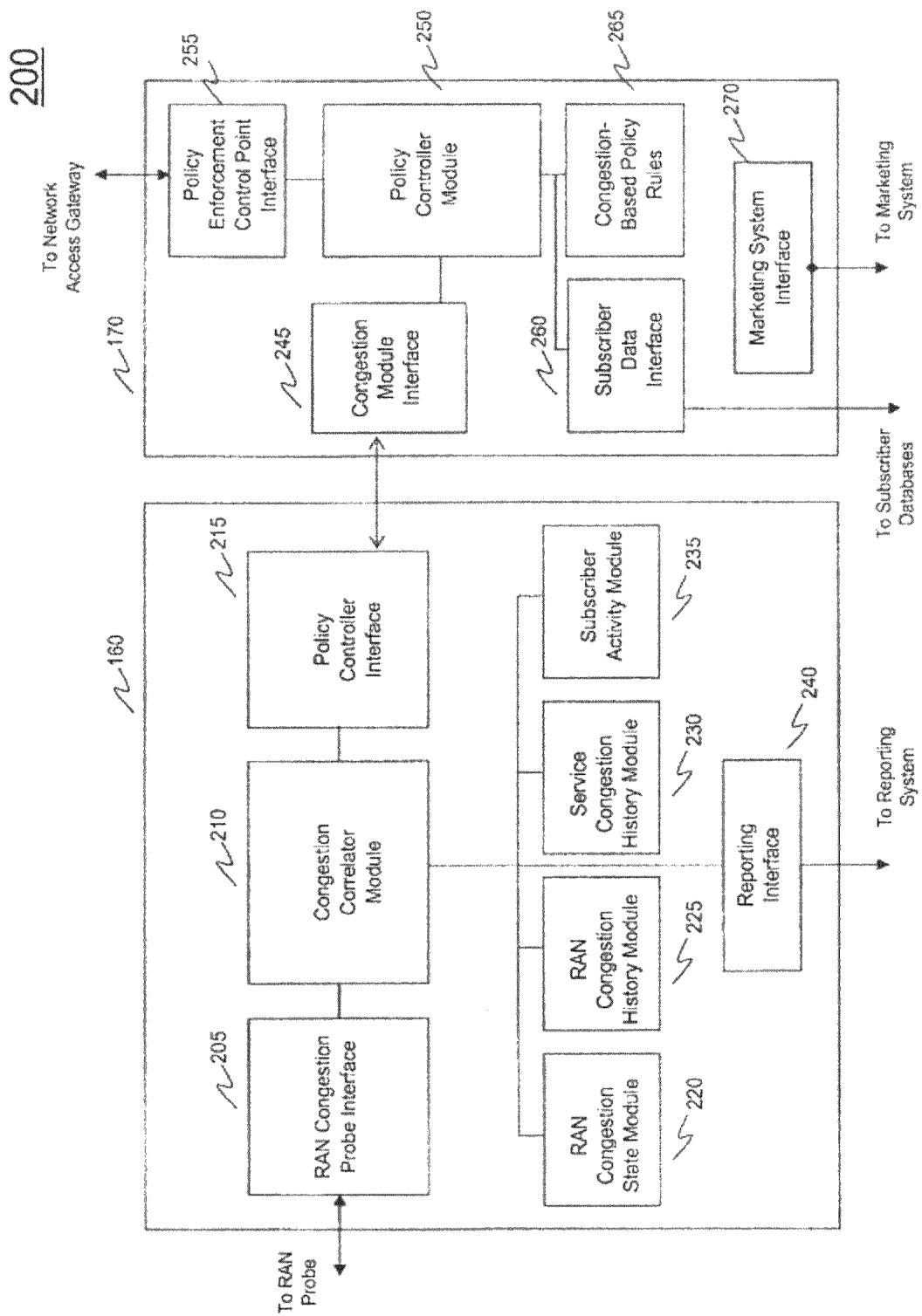
FIG. 2 depicts an exemplary system for managing communications network congestion, according to an embodiment of the invention.

FIG. 2 depicts an exemplary system for managing communications network congestion, according to an embodiment of the invention. In particular, FIG. 2 highlights Congestion Module 160 and Policy Controller 170. The specific functions and characteristics of Congestion Module 160 and Policy Controller 170 are associated within specific modules for ease of explanation, which is not intended to limit the scope of the invention based on the specific boundaries established by the block diagrams. For example, FIG. 2 illustrates a separate congestion module and policy controller, these systems could be incorporated into a single system or reside separately in two systems as shown in FIG. 2.

Congestion Module 160 includes RAN Congestion Probe Interface 205, Congestion Correlator Module 210, Policy Controller Interface 215, RAN Congestion State Module 220, RAN Congestion History Module 225, Service Congestion History Module 230, Subscriber Activity Module 235 and Reporting Interface 240.

RAN Congestion Probe Interface 205 interfaces with RAN Probe 150. RAN Congestion Probe Interface 205 receives congestion data records containing RAN congestion indicators from RAN Probe 150. RAN Congestion Probe Interface 205 also transmits control messages to RAN Probe 150. In particular, RAN Congestion Probe Interface 205 instructs RAN Probe 150 as to what types of RAN congestion indicators should be transmitted and how frequently such indicators should be captured and transmitted. RAN Congestion Probe Interface 205 is coupled to Congestion Correlator Module 210.

In addition to being coupled to RAN Congestion Probe Interface 205, Congestion Correlator Module 210 is also coupled to RAN Congestion State Module 220, RAN Congestion History Module 225, Service Congestion History Module 230, Subscriber Activity Module 235, Policy Controller Interface 215 and Reporting Interface 240.

Congestion Correlator Module 210 provides a number of functions. In particular, in an embodiment Congestion Correlator Module 210 determines what type of RAN congestion indicators should be requested from Probe 150 and how frequently the indicators should be sent. The frequency of receipt of RAN congestion indicators can be based on Probe 150 detecting a particular change in congestion indicators. For example, a bit error rate exceeding a particular threshold could trigger the capture and transmission of a set of congestion indicators. Alternatively, Congestion Correlator Module 210 can set the frequency for receipt of congestion indicators based on the congestion state for a RAN (e.g., when in a congested state, receive more frequent congestion indicators), based on the time of day given historical congestion patterns (e.g., when a particular time of day is known to experience congestion, receiving more frequent congestion indicators) or based on subscriber activity within the radio access network (e.g., when there are many subscribers connected through a particular radio access network, receiving more frequent congestion indicators.)

Upon receipt of RAN congestion indicators, Congestion Correlator Module 210 correlates the RAN congestion indicators to service congestion indicators. A service congestion indicator identifies whether, for example, IP bearer services are likely to be congested based on RAN congestion, and therefore service quality to users would likely be adversely affected. In an embodiment, service congestion indicators can include an indicator of present service congestion and an indicator of predicted service congestion in a future time period.

Congestion Correlator Module 210 generates service congestion indicators through a variety of approaches. In one embodiment, the service congestion indicator is simply a copy of the RAN congestion indicators. In another embodiment, Congestion Correlator Module 210 derives service congestion indicators based on RAN congestion state information and the received RAN congestion indicators. In another embodiment, Congestion Correlator Module 210 derives service congestion indicators based on RAN congestion history information for a particular RAN and the received RAN congestion indicators. In another embodiment, Congestion Correlator Module 210 derives service congestion indicators based on subscriber activity within a RAN and the received RAN congestion indicators. Alternatively, in another embodiment Congestion Correlator Module 210 derives service congestion indicators based on the received RAN congestion indicators and a combination of one or more of RAN congestion state information, RAN congestion history information, service congestion history, and subscriber activity within a RAN.

Upon generation of service congestion indicators, Congestion Correlator Module 210 provides the service congestion indicators to Policy Controller Interface 215, which in turn provides the indicators to policy controller 170 via Congestion Module Interface 245.

Additionally, in an embodiment, Congestion Correlator Module 210 provides RAN congestion indicators and service congestion indicators to Reporting Interface 240. Reporting Interface 240 transmits these indicators to a reporting system.

RAN Congestion State Module 220 includes congestion state information for all RANs for which Congestion Module 160 is coupled. For example, Congestion Module 160 may be interfaced to one hundred RANs. RAN Congestion State Module 220 would provide an indication of the current congestion state for each RAN.

RAN Congestion History Module 225 includes congestion state historical information for all RANs for which Congestion Module 160 is coupled. For example, RAN Congestion History Module 225 may include congestion state information for the last week for one hour increments that indicate the congestion state of each RAN coupled to Congestion Module 160.

Service Congestion History Module 230 includes service congestion historical information with a correlation to RAN congestion historical information. For example, Service Congestion History Module can include a measure of IP Bearer Service congestion and RAN congestion service indicators for the last week (or any duration) for one hour increments (or any increment). This data can be used to assist in predicting service congestion based on RAN congestion.

Subscriber Activity Module 235 indicates the subscribers that are serviced by a RAN at a given time for each RAN coupled to Congestion Module 160.

Policy controller 170 includes Congestion Module Interface 245, Policy Controller Module 250, Policy Enforcement Control Point 255, Subscriber Data Interface 260, Congestion-Based Policy Rules 265 and Marketing System Interface 270.

Policy controller 170, at a high level, includes subscriber profiles and network policies needed to manage network resources, such as bandwidth, according to a subscriber, session, and/or application. A service provider may apply a policy based on business rules associated with a variety of factors (e.g., service tiers and/or dynamic parameters such as time of day). The present invention focuses on business rules based on congestion factors, however, as will be known by individuals skilled in the relevant arts, business rules implemented by policy controllers consider many other factors in making policy decisions.

Upon receiving service congestion indicators, Policy Controller Module 250 generates policy decisions by applying congestion-based policy rules that are stored in Congestion-Based Policy Rules depository 265. A simple congestion-based policy rule, for example, is that if a service congestion indicator indicates service congestion is likely, then reduce the bandwidth permitted by all users that have standard usage plans, while allowing users with premium usage plans to continue to receive their full bandwidth allotment. A more complex congestion based policy rule may consider, for example, the service congestion indicator, the subscriber usage habits, the subscriber service plans, the types of services being used by subscribers, and generate a policy decision or decisions that impact different groups of subscribers based on these factors differently.

The congestion-based policy rules consider service congestion indicators relative to the current congestion status and/or a predicted congestion status. In this way, different congestion rules can be implemented to either reduce congestion or to avoid going into a congested state to ensure a particular quality of service for premium customers. In an embodiment, the policy rules can also utilize RAN congestion state information, RAN congestion history information, service congestion history and subscriber activity to generate policy decisions.

In order to use subscriber information in generating a policy decision, in an embodiment Policy controller 140 is coupled to a variety of subscriber databases through subscriber data interface 260. Subscriber data interface 260 provides access to a set of subscriber databases including a subscriber state database, a subscriber profile database and a subscriber usage database. The subscriber state database includes information that identifies and defines a subscriber's network session. Subscriber state information includes the subscriber identifier for the session. In embodiments of the invention, subscriber identifiers may be one or more of a Mobile Subscriber ISDN Number (MSISDN), a Mobile Identification Number (MIN), a Private Identifier, information about the network such as the IP address the subscriber is currently using and what network or networks to which the subscriber is currently connected, device information such as the device being used and the version of the software, location and roaming information, and other unique state information.

The subscriber profile database includes static information about the subscriber. This information may include the service tier (e.g., gold, silver, bronze) assigned to the subscriber.

The subscriber usage database includes static and dynamic information related to the subscriber's usage history. The subscriber's history includes, but is not limited to the subscriber's data usage history. In embodiments of the present invention, subscriber usage database may store information about the amount of data used on a per-application basis by the subscriber's user equipment 110 in previous sessions.

When Policy Control Module 250 makes a policy decision, Policy Control Module 250 provides control messages that implement the policy decision to Policy Enforcement Control Point Interface 255. Policy Enforcement Control Point Interface 255 transmits the control messages to Network Access Gateway 130. Network Access Gateway then enforces the policy decision, for example, by denying access of users to video streaming applications that may be a source of service congestion.

Figure 3:
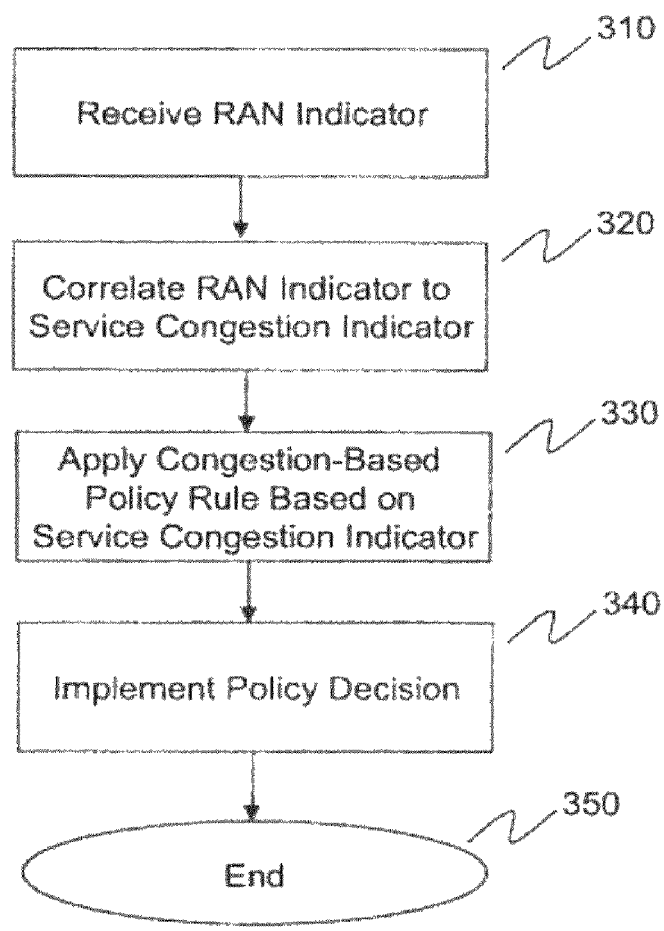
FIG. 3 provides an exemplary method for managing communications network congestion, according to an embodiment of the invention.

FIG. 3 provides an exemplary method 300 for managing communications network congestion, according to an embodiment of the invention. For the purposes of illustrating method 300, reference is made to the exemplary operating environment depicted in FIG. 1 and the exemplary implementations of a congestion module and policy controller in FIG. 2. These references are intended only for ease of illustration, and not intended to limit the invention to the specific embodiments within FIGS. 1 and 2.

Method 300 begins in step 310. In step 310 one or more RAN congestion indicators are received. For example, Congestion Module 160 receives a congestion data record from RAN Probe 150 that includes one or more RAN congestion indicators.

In step 320, the RAN congestion indicators are correlated to one or more service congestion indicators. For example, Congestion Correlator Module 210 correlates the RAN congestion indicators to service congestion indicators. In an embodiment, the RAN congestion indicators can be transmitted directly to Policy Controller Module 250. In this scenario, congestion based policy rules would include policy rules that depend on RAN congestion indicators rather than service congestion indicators. A variety of approaches are used to correlate RAN congestion indicators to service congestion indicators.

In one embodiment, the service congestion indicator is simply a copy of the RAN congestion indicators. In another embodiment, Congestion Correlator Module 210 derives service congestion indicators based on RAN congestion state information and the received RAN congestion indicators. In another embodiment, Congestion Correlator Module 210 derives service congestion indicators based on RAN congestion history information for a particular RAN and the received RAN congestion indicators. In another embodiment, Congestion Correlator Module 210 derives service congestion indicators based on subscriber activity within a RAN and the received RAN congestion indicators. Alternatively, in another embodiment Congestion Correlator Module 210 derives service congestion indicators based on the received RAN congestion indicators and a combination of one or more of RAN congestion state information, RAN congestion history information, service congestion history, and subscriber activity within a RAN.

In step 330 one or more congestion-based policy rules are applied based on at least the service congestion indicator. For example, upon receiving service congestion indicators, Policy Controller Module 250 generates policy decisions by applying congestion-based policy rules that are stored in Congestion-Based Policy Rules depository 265. A simple congestion-based policy rule, for example, is that if a service congestion indicator indicates service congestion is likely, then reduce the bandwidth permitted by all users that have standard usage plans, while allowing users with premium usage plans to continue to receive their full bandwidth allotment.

In step 340, the policy decision is implemented. For example, when Policy Control Module 250 makes a policy decision, Policy Control Module 250 provides control messages that implement the policy decision to Policy Enforcement Control Point Interface 255. Policy Enforcement Control Point Interface 255 transmits the control messages to Network Access Gateway 130. Network Access Gateway then enforces the policy decision, for example, by denying access of users to video streaming applications that may be a source of service congestion.

The following three examples illustrate how embodiments of the invention are used to manage network congestion to affect customer service experiences. In one example, it is a Monday afternoon and User A has an all-you-can-use data plan with her service provider. She is watching videos on YouTube. Because the network is not congested, she is allowed to burst for the period of time that she is watching the video. Thus, her service quality is quite good. On Monday evening, she returns to the YouTube service to show her friends the videos that she was watching earlier. She is attached to cell site A, which is experiencing congestion. A congestion module, such as Congestion Module 160, receives updated RAN congestion indicators from a probe, such as RAN probe 150. A policy controller module, such as Policy Controller Module 250 looks up the cell site and the attached subscribers, along with their entitlements and profiles. Policy Controller Module 250 applies a congestion-based policy rule, such that based on the RAN congestion indicator, all subscribers who are on an all-you-can use data plan have their QOS downgraded. This policy decision is then transmitted by a policy enforcement control point interface to a network access gateway to effect the policy decision. As a result, User A is downspeeded during the congestion event. In an embodiment, User A also receives a proactive notification (e.g., an SMS message) from the service provider advising that her connection will be downspeeded according to her fair usage policy. The transmission of the SMS message is initiated through Marketing System Interface 270 following the policy decision to downspeed service. The notification will offer her an opportunity to upgrade her service to the next service level or purchase a temporary speed boost. Alternatively, the policy decision could include the blocking of a service known to consume significant bandwidth, such as, for example streaming video access is blocked, or even more specifically streaming video access from Youtube is blocked.

In another example, it is Monday evening and User B is currently downloading music from his apartment and is connected to Cell Site A. User B is a premium subscriber and is experiencing a slower than usual download. Cell Site A is currently experiencing high levels of congestion. A congestion module, such as Congestion Module 160, receives an updated congestion indicator in real time from a RAN probe, such as RAN probe 150. As in the first example, Congestion Correlator Module 210 correlates the RAN congestion indicator to a service congestion indicator and transmits the service congestion indicator to Policy Controller Module 250. Policy Controller Module 250 determines what subscribers are attached to the cell site, along with their entitlements and profiles. Policy Controller Module 250 makes a policy decision to downgrade the QoS for subscribers that have all-you-can use data plans, but not to downgrade QoS for subscribers that have premium plans. The policy decision is implemented by transmitting control instructions from Policy Enforcement Control Point Interface 255 to the Network Access Gateway, for example, a GGSN. As a result User B, as a premium subscriber is not targeted for downgrade, and his service experience improves as congestion abates on a Cell Site A.

In a third example, rather than provide a reactive policy decision, a proactive policy decision is made. The present invention can predict service congestion situations based on the RAN congestion indicators, RAN congestion history and service congestion history to prevent users, such as premium users, from experiencing congestion, or at least reducing congestion for selected users. Congestion Correlator Module 210 includes the capability to perform pattern recognition, such that when a series of received RAN congestion indicators are mirroring a pattern seen before within the RAN congestion history that corresponds to a service congestion event in the Service Congestion History Module 230, then the Congestion Correlator Module 210 generates a predictive service congestion indicator that is transmitted to policy controller module 255. Congestion-based rules are established that address how to address instances of predicted service congestion. For example, one rule might simply be to send an SMS message to all users within the effected cell site that indicates network congestion is likely and encouraging them to reduce usage. Alternatively, certain subscriber classes can have their QoS scaled down in moderation.

Figure 4:
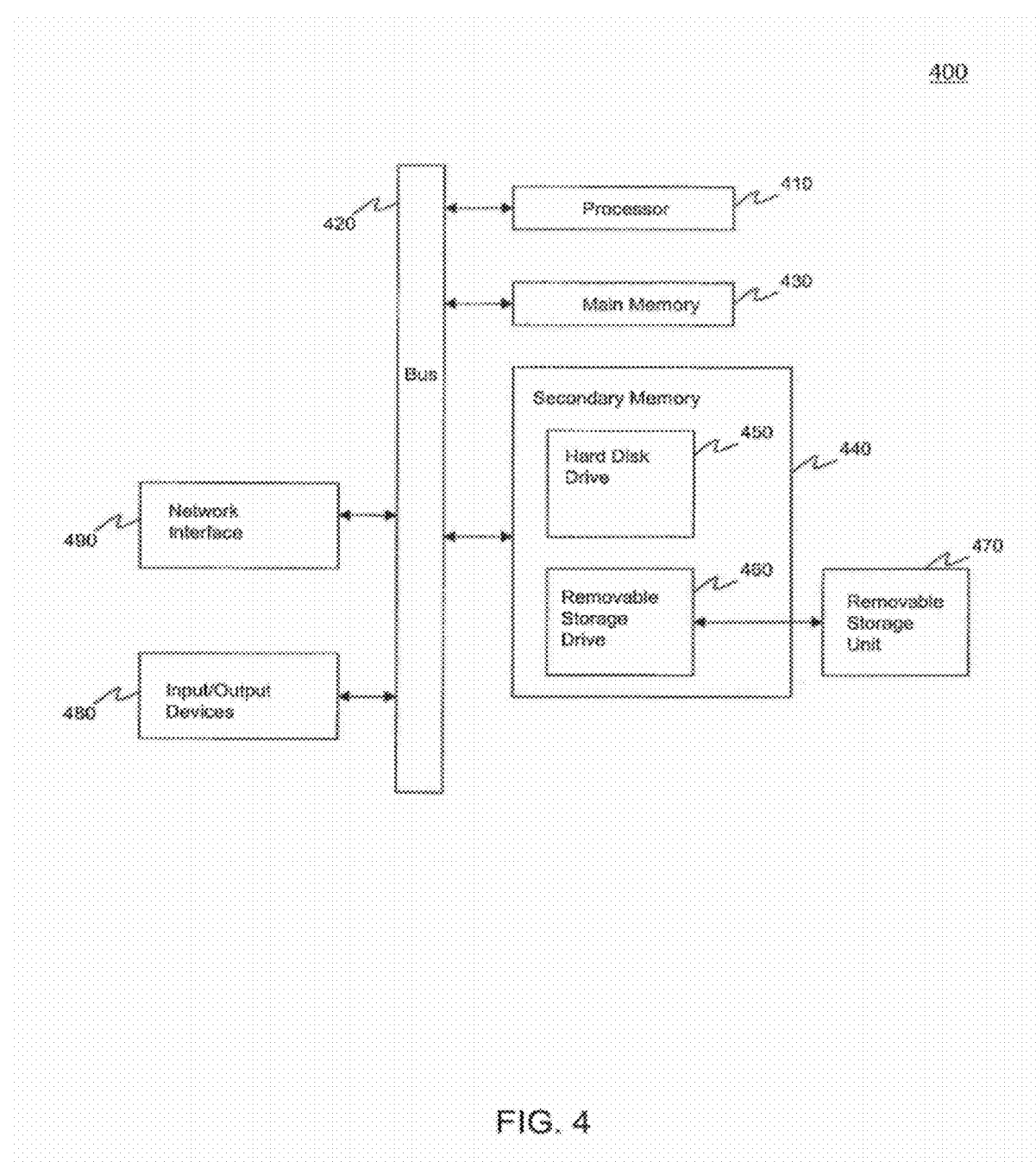
FIG. 4 depicts an exemplary computer system on which methods and systems herein may be implemented, according to embodiments of the present invention.

In an embodiment of the present invention, the methods and systems of the present invention described herein are implemented using well-known computers, such as a computer 400 shown in FIG. 4. The computer 400 can be any commercially available and well-known computer capable of performing the functions described herein, such as computers available from International Business Machines, Apple, Sun, HP, Dell, etc.

Computer 400 includes one or more processors (also called central processing units, or CPUs), such as processor 410. Processor 410 is connected to communication bus 420. Computer 400 also includes a main or primary memory 430, preferably random access memory (RAM). Primary memory 430 has stored therein control logic (computer software), and data.

Computer 400 may also include one or more secondary storage devices 440. Secondary storage devices 440 include, for example, hard disk drive 450 and/or removable storage device or drive 460. Removable storage drive 460 represents a floppy disk drive, a magnetic tape drive, a compact disk drive, an optical storage device, tape backup, ZIP drive, JAZZ drive, etc.

Removable storage drive 460 interacts with removable storage unit 470. As will be appreciated, removable storage drive 460 includes a computer usable or readable storage medium having stored therein computer software (control logic) and/or data. Removable storage drive 460 reads from and/or writes to the removable storage unit 470 in a well-known manner.

Removable storage unit 470, also called a program storage device or a computer program product, represents a floppy disk, magnetic tape, compact disk, optical storage disk, ZIP disk, JAZZ disk/tape, or any other computer data storage device. Program storage devices or computer program products also include any device in which computer programs can be stored, such as hard drives, ROM or memory cards, etc.

In an embodiment, the present invention is directed to computer program products or program storage devices having software that enables computer 400, or multiple computer 400s to perforin any combination of the functions described herein Computer programs (also called computer control logic) are stored in main memory 430 and/or the secondary storage devices 440. Such computer programs, when executed, direct computer 400 to perform the functions of the present invention as discussed herein. In particular, the computer programs, when executed, enable processor 410 to perform the functions of the present invention. Accordingly, such computer programs represent controllers of the computer 400.

Computer 400 also includes input/output/display devices 480, such as monitors, keyboards, pointing devices, etc.

Computer 400 further includes a communication or network interface 490. Network interface 490 enables computer 400 to communicate with remote devices. For example, network interface 490 allows computer 400 to communicate over communication networks, such as LANs, WANs, the Internet, etc. Network interface 490 may interface with remote sites or networks via wired or wireless connections. Computer 400 receives data and/or computer programs via network interface 490. The electrical/magnetic signals having contained therein data and/or computer programs received or transmitted by the computer 400 via network interface 490 also represent computer program product(s).

The invention can work with software, hardware, and operating system implementations other than those described herein. Any software, hardware, and operating system implementations suitable for performing the functions described herein can be used.

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A system for managing communications network congestion, comprising:
   a radio access network (RAN) interface configured:
      to receive RAN congestion indicators of both a first type and a second type,
      transmit a control message indicating that the RAN congestion indicators of the second type are to be received in the future, and no more of the RAN congestion indicators of the first type are to be received in the future, and
      in response to the control message, receiving additional one or more RAN congestion indicators of the second type captured according to the control message;
   a congestion correlator module configured to correlate the additional one or more RAN congestion indicators of the second type to service congestion indicators by copying the additional one or more RAN congestion indicators of the second type to the service congestion indicators;
   a database comprising congestion based policy rules, wherein the congestion-based policy rules establish control responses based on at least one or more service congestion indicators;
   a policy controller module configured to apply the congestion-based policy rules to achieve a policy decision; and
   a policy enforcement control point interface configured to transmit network control instructions to enforce the policy decision.

2. The system of claim 1, further comprising a RAN congestion history module configured to store the RAN congestion indicators associated with a RAN as a function of time.

3. The system of claim 1, further comprising a RAN congestion state module configured to store congestion state information for a RAN.

4. The system of claim 1, further comprising a marketing interface configured to transmit a marketing congestion indicator, wherein the marketing congestion indicator includes an indication that a user's experience will be adjusted based on network congestion considerations.

5. The system of claim 1, further comprising an interface configured to gather RAN user activity information, wherein the RAN user activity information identifies the users being serviced by a RAN and the type of services being provided.

6. The system of claim 1, wherein the congestion correlator module is further configured to analyze the RAN congestion indicators to generate service congestion indicators that predict future service congestion.

7. The system of claim 1, wherein the congestion correlator module is further configured to generate service congestion indicators based on one or more of the RAN congestion indicators, RAN congestion states, RAN congestion trends, historical RAN congestion patterns, and historical service congestion patterns.

8. The system of claim 1, wherein the congestion-based policy rules adjust limitations on bandwidth allowances, adjust service traffic priority, or block access to certain applications.

9. The system of claim 1, wherein the congestion-based policy rules are imposed against classes of users.

10. The system of claim 1, wherein the RAN congestion indicators include dropped packets, dropped calls, error rates, and RAN power consumption.

11. The system of claim 1, wherein the communications network operates using a WIMAX, LTE, UMTS or CDMA protocol.

12. The method of claim 1, wherein the control message further indicates a frequency for receipt of the RAN congestion indicators of the second type based on a congestion state of the RAN.

13. The method of claim 1, wherein the control message further indicates a frequency for receipt of the RAN congestion indicators of the second type based on a time of day given historical congestion patterns.

14. The method of claim 1, wherein the control message further indicates a frequency for receipt of the RAN congestion indicators of the second type based on a subscriber activity within a RAN.

15. A method for managing communications network congestion, comprising:
   receiving one or more radio access network (RAN) congestion indicators of a first type;
   receiving one or more radio access network (RAN) congestion indicators of a second type;

transmitting a control message indicating that the RAN congestion indicators of the second type are to be received in the future, and no more of the RAN congestion indicators of the first type are to be received in the future;

in response to the control message, receiving additional one or more RAN congestion indicators of the second type captured according to the control message;

correlating the additional one or more RAN congestion indicators of the second type to one or more service congestion indicators, wherein correlating the additional one or more RAN congestion indicators of the second type to the one or more service congestion indicators includes copying the additional one or more RAN congestion indicators of the second type to the one or more service congestion indicators;

applying a congestion-based policy rule based on the one or more service congestion indicators to generate a policy decision; and implementing the policy decision.

16. The method of claim 15, further comprising transmitting a reporting message that includes one or more of the RAN congestion indicators.

17. The method of claim 15, further comprising transmitting a marketing message that includes an indication that a congestion-based policy decision has been made.

18. The method of claim 17, further comprising transmitting a marketing offer to one or more users that are impacted by the congestion-based policy decision.

19. The method of claim 15, further comprising storing one or more of the RAN congestion indicators and associating the one or more of the RAN congestion indicators with a RAN.

20. The method of claim 15, further comprising storing congestion state information based on the RAN congestion indicators for a RAN.

21. The method of claim 20, wherein the stored congestion state information includes a periodic and incremental logging of the RAN congestion indicators for the RAN.

22. The method of claim 15, wherein correlating the additional one or more RAN congestion indicators of the second type results in the one or more service congestion indicators being the same as the additional one or more RAN congestion indicators of the second type.

23. The method of claim 15, wherein correlating the additional one or more RAN congestion indicators of the second type to the one or more service congestion indicators includes determining one or more service congestion indicators based on the additional one or more RAN congestion indicators of the second type and RAN state information.

24. The method of claim 15, wherein correlating the additional one or more RAN congestion indicators of the second type to one or more service congestion indicators includes determining one or more service congestion indicators based on the additional one or more RAN congestion indicators of the second type, and one or more of RAN congestion state information, historical service congestion associated with a RAN, subscriber activity associated with the RAN, and time of day.

25. The method of claim 15, wherein implementing the policy decision includes transmitting a second control message to a policy control enforcement point that adjusts the service characteristics of users associated with a RAN for which the additional one or more RAN congestion indicators of the second type are received.

26. The method of claim 15, wherein the one or more service congestion indicators include a present state service congestion indicator, and a predicted state service congestion indicator.

27. The method of claim 15, wherein the RAN congestion indicators include dropped packets, dropped calls, error rates and RAN power consumption.

28. The method of claim 15, wherein the communications network operates using a WIMAX, LTE, UMTS or CDMA protocol.

* * * * *